US006604999B2

(12) United States Patent
Ainsworth

(10) Patent No.: US 6,604,999 B2
(45) Date of Patent: Aug. 12, 2003

(54) GAMING MACHINE WITH UNEVEN PAYLINES

(75) Inventor: Mark Ainsworth, Sydney (AU)

(73) Assignee: Aristocrat Technologies Australia Pty Ltd., Lane Cove (AU)

( * ) Notice: Subject to any disclaimer, the term of this patent is extended or adjusted under 35 U.S.C. 154(b) by 0 days.

(21) Appl. No.: 09/908,284

(22) Filed: Jul. 18, 2001

(65) Prior Publication Data

US 2002/0065124 A1 May 30, 2002

(30) Foreign Application Priority Data

Jul. 28, 2000 (AU) ............................................. PQ9079

(51) Int. Cl.$^{7}$ ............................ A63F 13/00; A63F 9/24
(52) U.S. Cl. ..................................... 463/20; 273/142 R
(58) Field of Search ............................ 463/18, 19, 20, 463/21; 273/142 R, 143 R

(56) References Cited

U.S. PATENT DOCUMENTS

| | | | | | |
|---|---|---|---|---|---|
| 4,198,052 | A | * | 4/1980 | Gauselmann | 273/143 R |
| 5,580,053 | A | * | 12/1996 | Crouch | 463/20 |
| 5,611,535 | A | * | 3/1997 | Tiberio | 273/143 R |
| 6,261,178 | B1 | * | 7/2001 | Bennett | 463/20 |
| 6,319,124 | B1 | * | 11/2001 | Baerlocher et al. | 463/20 |
| 2002/0055382 | A1 | * | 5/2002 | Meyer | 463/20 |
| 2002/0094862 | A1 | * | 7/2002 | Inoue | 463/20 |

* cited by examiner

*Primary Examiner*—Denise L. Esquivel
*Assistant Examiner*—Marc Norman
(74) *Attorney, Agent, or Firm*—Katten Muchin Zavis Rosenman

(57) ABSTRACT

A gaming machine 10 has a display 14 and a game controller arranged to control images displayed on the display 14. The game controller is arranged to play a game 16 wherein at least one random event is caused to be displayed on the display 14 and, if a predefined winning event occurs, the machine 10 awards a prize. A matrix of symbol positions is displayed on the display 14 and at least one payline is associated with the matrix. The payline is comprised of an equal number of symbol positions as there are columns in the matrix but passes through fewer than all of the columns.

14 Claims, 5 Drawing Sheets

GAMING MACHINE WITH UNEVEN PAYLINES

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a game wherein at least one random event is caused to be displayed on the display means and, if a predefined winning event occurs, the machine awards a prize, the gaming machine being characterized in that a matrix of symbol positions is displayed and in that at least one payline is associated with the matrix, said at least one payline being comprised of an equal number of symbol positions as there are columns in the matrix but passing through fewer than all of the columns.

Preferably, the matrix is constituted by visible display positions of conventional spinning reels. In other words, to form a 3×5 matrix, there may be five reels each having three visible display positions. For ease of explanation, the invention will be described with reference to its application as a five reel game. Hence, the at least one payline may pass through more than one symbol position in respect of at least one of the reels. As a result, the at least one reel may have the same symbols in adjacent reel strip positions.

In another embodiment of the invention, the matrix may be made up of discrete symbol-carrying elements, such as individual reels. In other words, each symbol-carrying element may be a reel so that, in the case of a 3×5 matrix, there are fifteen reels.

The at least one payline may have a variety of patterns. For example, the payline may have a T-shape, a T-shape lying on its side, a cross shape, a tick shape, or the like. Still further, the term "payline", in this specification is to be understood in a broad sense as including associated, but non-adjoining display positions of the reels. Thus, the at least one payline may be discontinuous or interrupted and may be made up of non-adjoining display positions of the reels. As an example, the relevant payline may be made up of the symbols at the four corner positions of the reels plus the symbol at the central position of a centre reel in the case of a five reel display.

The at least one payline may be provided instead of, or in addition to, standard gaming machine paylines presently in use.

The at least one payline may vary automatically from game to game. Instead, a player may be able to select the pattern of the at least one payline which that player desires.

The at least one payline may be highlighted, in use. In addition, a pattern constituting said at least one payline may be superimposed over the display positions on the display means. Thus, in the case of a spinning reel game, the pattern may be superimposed over the reels which may appear to spin behind the pattern.

A prize paid in respect of a winning combination of symbols on the at least one payline may have an increased value in comparison with a prize paid for the same winning combination appearing on standard paylines of the gaming machine. In addition, the prize combination for the at least one payline may pay for the symbols appearing anywhere on said payline even when standard paylines pay only in respect of a predetermined arrangement of symbols, for example, a left-to-right combination of symbols.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
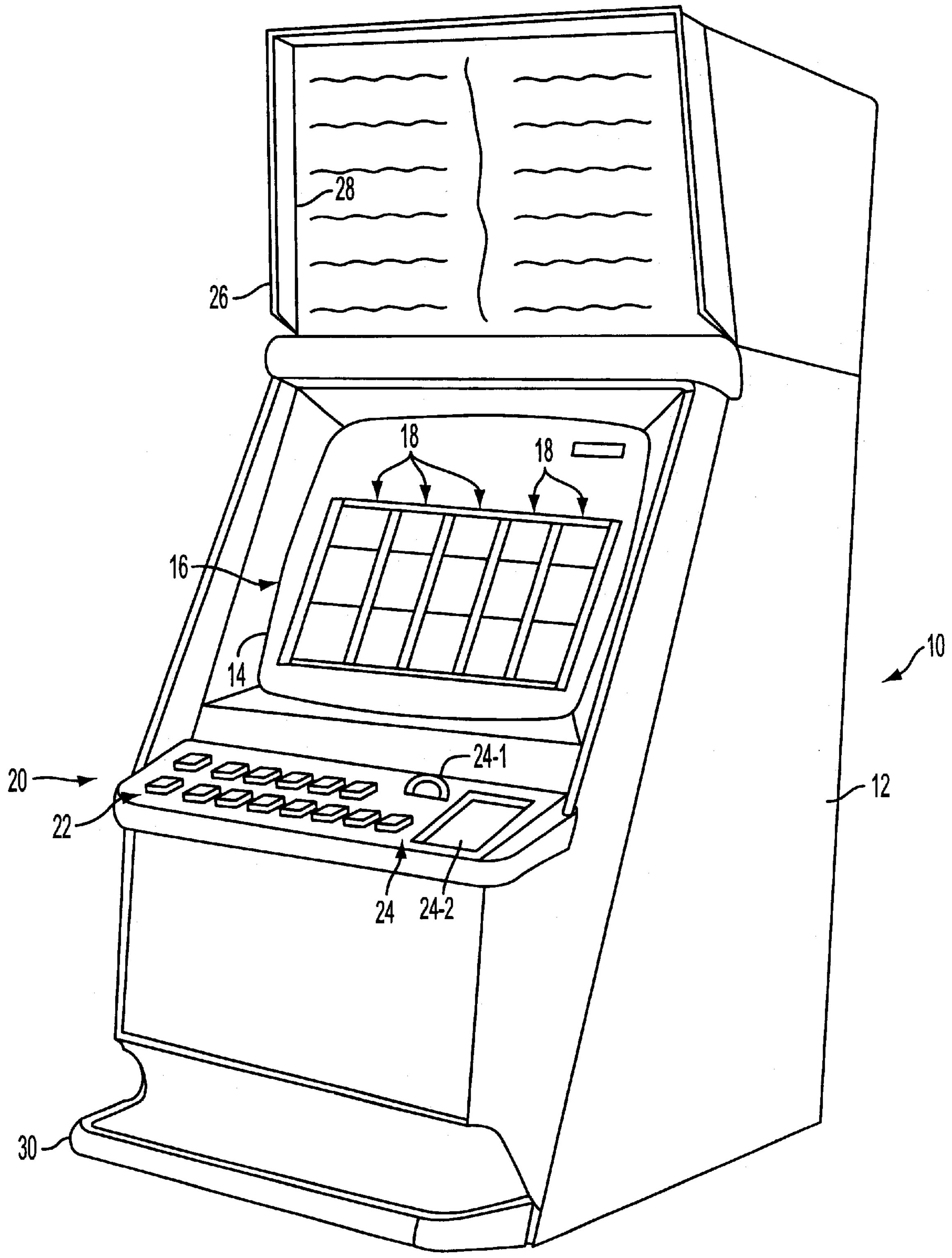
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
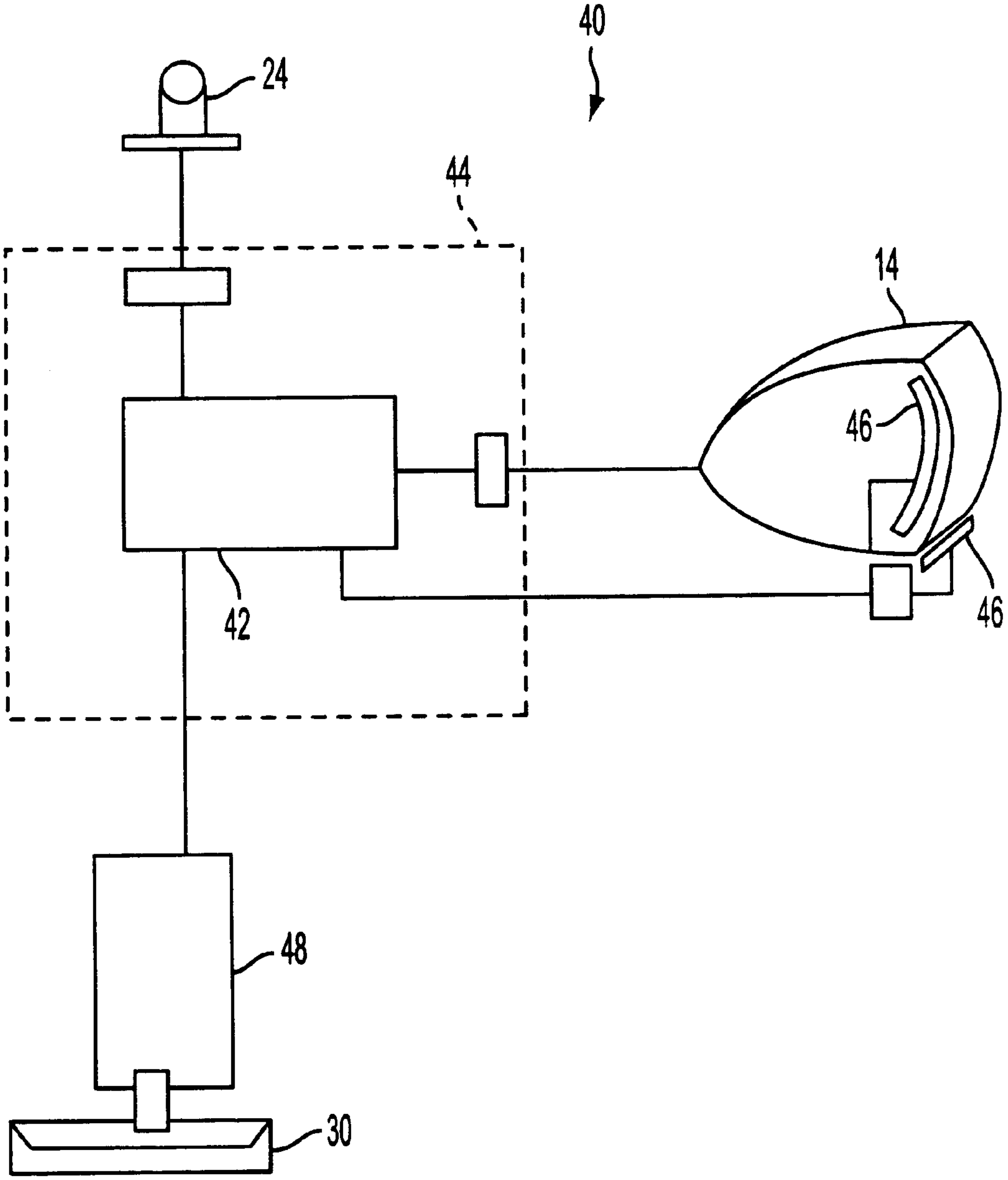
FIG. 2 shows a block diagram of a control circuit of the gaming machine.

Referring now to FIG. 2 of the drawings, a control means or control circuit 40 is illustrated. A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors mounted in the screen. The controller 44 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 44 drives a payout mechanism 48 which, for example, may be a coin hopper for feeding coins to the coin tray 30 to make a pay out to a player when the player wishes to redeem his or her credit.

Referring to FIGS. 3 to 6 of the drawings, various examples of screen displays 50 of the game 16 are shown. The game 16 is a five reel spinning reel type game. The game has three standard paylines 52 and a special pattern or bonus payline 54 that changes from game to game. Whenever a player commences a game and the reels 18 start spinning a pattern is highlighted over the symbols indicating the special pattern payline 54 or bonus payline 54. Winning combinations of symbols on the special pattern payline 54 are determined in the same way as they are for the standard paylines but the prizes for the same combinations are multiplied by five. In a preferred form of the invention, a new bonus payline 54 is selected for every game played.

The feature of the special pattern payline 54 may occur automatically for each game or, instead, the player may have to make an additional bet in order for the special pattern payline 54 to be applicable.

All the paylines 52 and 54 are made up of five symbols when the game 16 is a five reel game. It is also to be noted that the special payline 54 does not pass through all the reels 18. Accordingly, as illustrated in the fifth reel 18 in FIGS. 3 to 6 of the drawings, identical symbols are placed next to each other in certain positions on at least one of the reel strips in order for maximum prize combinations to apply to the special pattern payline or bonus payline 54. This also means that the probabilities relating to each combination will be different for different patterns and different to those for standard paylines. Since it is more difficult to achieve a winning combination on the special pattern paylines 54, a bonus, as described above, is paid for such combinations.

Figure 3:
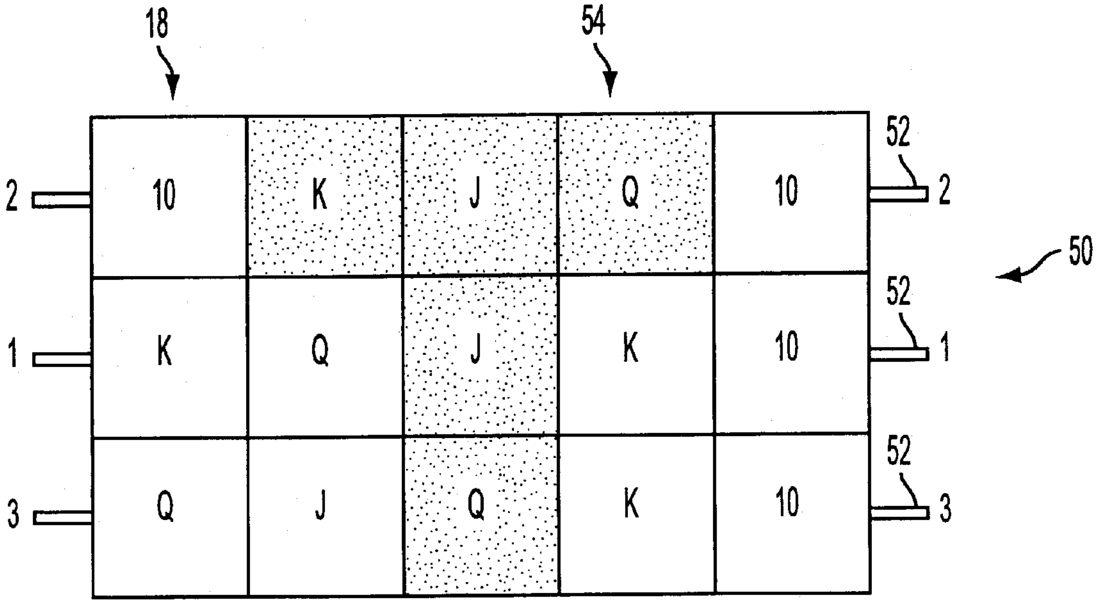
FIGS. 3 to 6 show various embodiments of screen displays of games including bonus paylines, in accordance with the invention.
Figure 4:
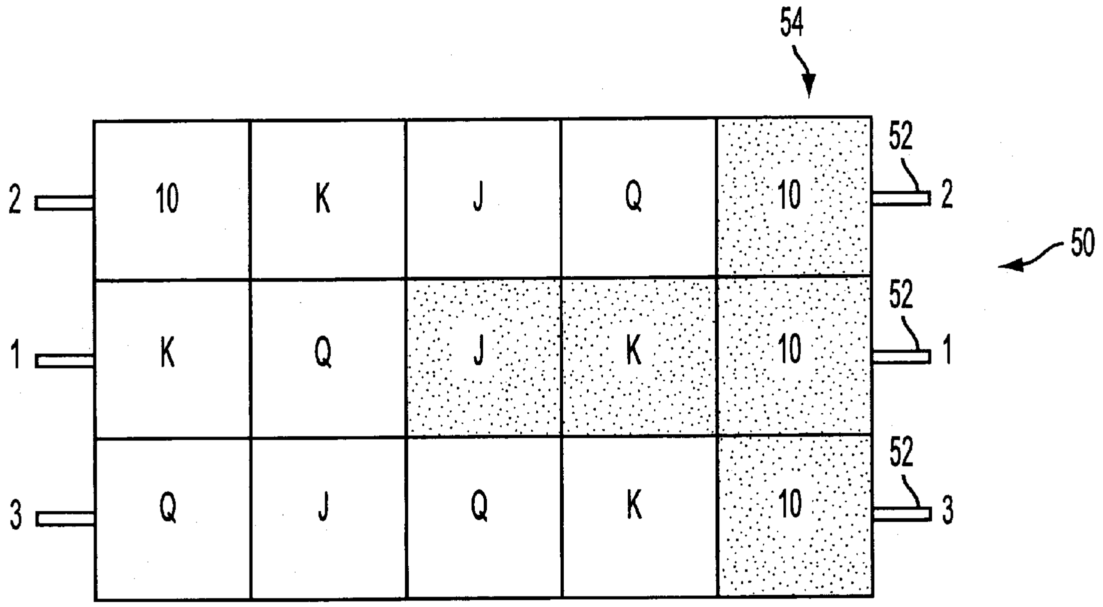
Figure 5:
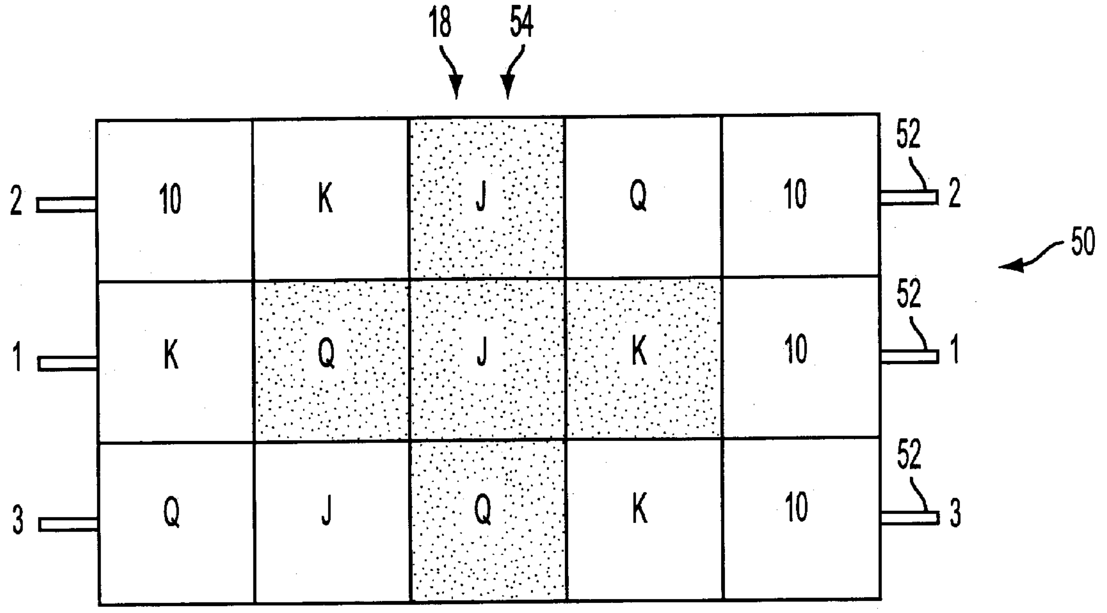
Figure 6:
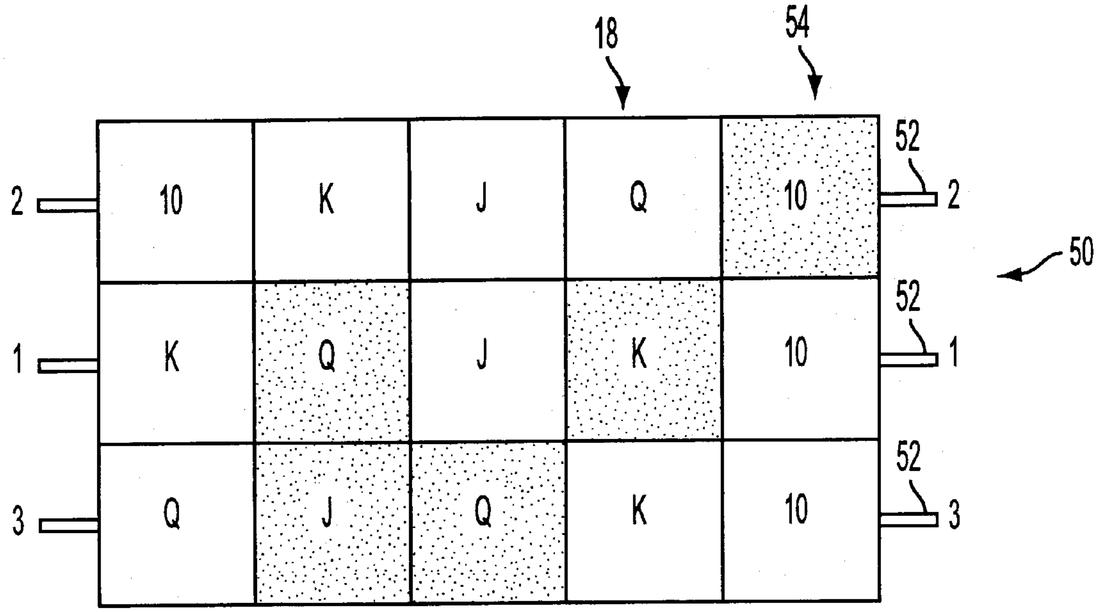

In the example shown in FIG. 3 of the drawings, the special pattern payline 54 is a T-shaped payline centred on the central reel 18. In the example shown in FIG. 4 of the drawings, the special pattern payline 54 is a T-shape lying on its side with a "cap" of the T lying on the fifth reel 18. In the example shown in FIG. 5 of the drawings, the special pattern payline 54 is in the form of a cross centred on the central reel 18 and the first or centre payline 52. In the example shown in FIG. 6 of the drawings, the special pattern payline 54 is in the form of a tick.

It will also be appreciated that the special pattern payline 54 may not be continuous and individual, non-adjoining symbol positions could constitute the special pattern payline 54. Thus, for example, in respect of a five reel game, the four corner symbol positions and the centre symbol position of the central reel 18 could constitute the special pattern payline 54.

It will be appreciated that, instead of each reel being made up of a continuous reel strip, the game 16 could comprise 15 separate reels where each reel provides a symbol position.

Hence, it is an advantage of the invention that a special pattern payline 54 is provided which, the applicant believes, will enhance player interest and increase player attraction.

Figure 7:
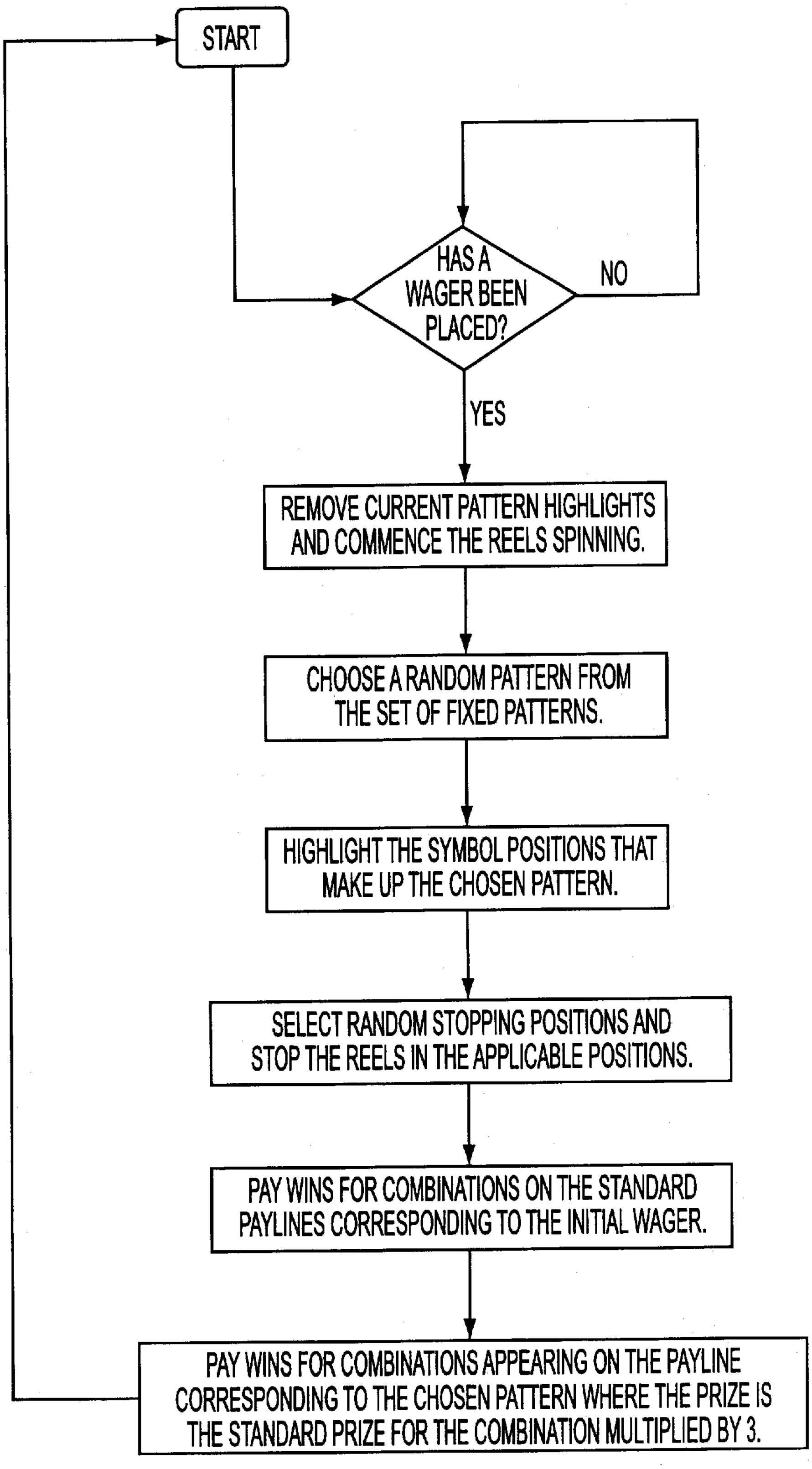
FIG. 7 shows a flow chart of the game played on the gaming machine.

FIG. 7 shows a flow chart of the game played on the gaming machine.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A gaming machine having a display means and a game control means arranged to control images displayed on the display means, the game control means being arranged to play a game wherein at least one random event is caused to be displayed on the display means and, if a predefined winning event occurs, the machine awards a prize, the gaming machine being characterized in that a matrix of symbol positions is displayed and in that at least one payline is associated with the matrix, said at least one payline being comprised of an equal number of symbol positions as there are columns in the matrix but passing through fewer than all of the columns.

2. The gaming machine of claim 1 in which the matrix is constituted by visible display positions of conventional spinning reels.

3. The gaming machine of claim 2 in which said at least one payline passes through more than one symbol position in respect of at least one of the reels.

4. The gaming machine of claim 3 in which said at least one reel has the same symbols in adjacent reel strip positions.

5. The gaming machine of claim 1 in which the matrix is made up of discrete symbol-carrying elements.

6. The gaming machine of claim 1 in which said at least one payline has a variety of patterns.

7. The gaming machine of claim 6 in which said at least one payline is discontinuous and is made up of non-adjoining symbol positions.

8. The gaming machine of claim 1 in which said at least one payline is provided instead of standard gaming machine paylines presently in use.

9. The gaming machine of claim 1 in which said at least one payline varies automatically from game to game.

10. The gaming machine of claim 1 in which a player is able to select the pattern of said at least one payline which that player desires.

11. The gaming machine of claim 1 in which said at least one payline is highlighted, in use.

12. The gaming machine of claim 1 in which a pattern constituting said at least one payline is superimposed over the display positions on the display means.

13. The gaming machine of claim 1 in which a prize paid in respect of a winning combination of symbols on said at least one payline has an increased value in comparison with a prize paid for the same winning combination appearing on standard paylines of the gaming machine.

14. The gaming machine of any one of the preceding claims in which the prize combination for said at least one payline pays for the symbols appearing anywhere on said payline even when standard paylines pay only in respect of a predetermined arrangement of symbols.

* * * * *